No. 863,089. PATENTED AUG. 13, 1907.
C. T. POWELL.
SAFETY BRASS FOR MOTOR BEARINGS.
APPLICATION FILED MAR. 30, 1906.

C. T. Powell,
Inventor

Witnesses
Jas. F. McCathran
H. F. Riley

By E. G. Siggers
Attorney

UNITED STATES PATENT OFFICE.

CHRISTOPHER T. POWELL, OF NEW ALBANY, INDIANA.

SAFETY-BRASS FOR MOTOR-BEARINGS.

No. 863,089.　　　Specification of Letters Patent.　　　Patented Aug. 13, 1907.

Application filed March 30, 1906. Serial No. 308,909.

*To all whom it may concern:*

Be it known that CHRISTOPHER T. POWELL, a citizen of the United States, residing at New Albany, in the county of Floyd and State of Indiana, has invented a new and useful Safety-Brass for Motor-Bearings, of which the following is a specification.

The invention relates to a safety brass for motor bearings.

The object of the present invention is to improve the construction of journal bearings, and to provide a simple, inexpensive and efficient device designed for use in motor bearings, and adapted to form a support for the armature shaft to prevent the armature from dropping upon the poles, should the Babbitt, or other soft metal lining, melt.

With these and other objects in view, the invention consists in the construction and novel combination and arrangement of parts, hereinafter fully described, illustrated in the accompanying drawing, and pointed out in the claims, hereto appended; it being understood that various changes in the form, proportion, size, and minor details of construction, within the scope of the claims, may be resorted to without departing from the spirit or sacrificing any of the advantages of the invention.

Figure 1:
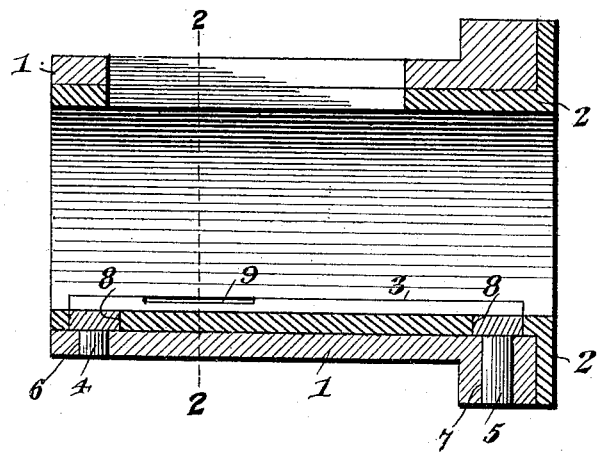
Figure 2:
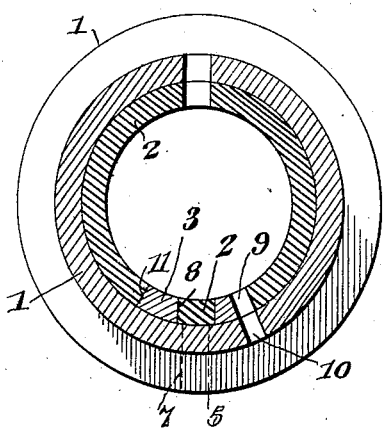
Figure 3:
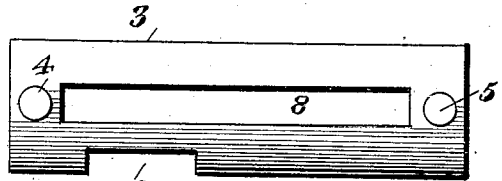
Figure 4:
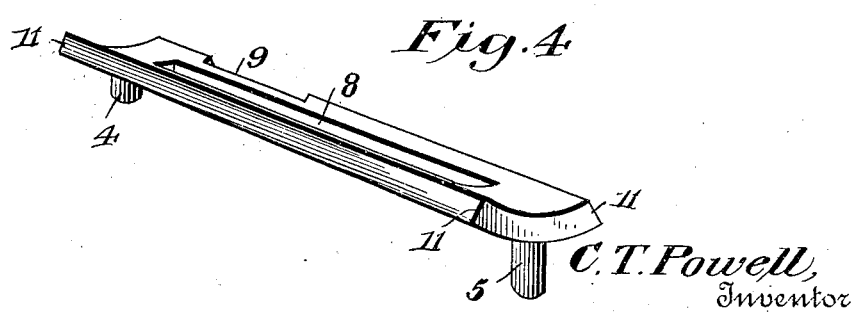

In the drawing:—Figure 1 is a longitudinal sectional view of a motor bearing provided with a safety brass constructed in accordance with this invention. Fig. 2 is a transverse sectional view on the line 2—2 of Fig. 1. Fig. 3 is a reverse plan view of the safety brass. Fig. 4 is a perspective view of the same.

Like numerals of reference designate corresponding parts in all the figures of the drawing.

1 designates the outer shell or casing of a cylindrical motor bearing, which is constructed of cast metal, or other suitable material, and which is provided with a Babbitt, or other soft metal lining 2. The soft metal lining 2 is cylindrical, being of uniform thickness, as clearly illustrated in Figs. 1 and 2 of the drawing, and in order to support the armature shaft, and prevent the armature from dropping upon the poles should the soft metal lining melt, a safety brass 3 is provided. The safety brass consists of a curved plate constructed of brass or bronze, and arranged at the bottom of the bearing to form a positive support for the motor shaft. The plate 3, which is curved, is of the same thickness as the soft metal lining, and it is provided with studs 4 and 5, which interlock the plate with the bottom of the outer shell or casing of the journal bearing. The studs or lugs 4 and 5, which are integral with the plate 3, fit in openings 6 and 7 of the outer shell or casing, the studs or lugs being of a length to correspond with the thickness of the outer shell or casing, the stud or lug 5 being longer than the other, as clearly illustrated in Fig. 1 of the drawing.

The safety device is adapted to be readily applied to any motor shaft bearing, by simply boring suitable holes for the reception of the projecting lugs or studs, and the plate is provided with a central longitudinal opening 8 to receive a quantity of the soft metal lining, and to arrange the same at the bottom of the bearing. The plate 3 is also provided at one side with a recess 9, which corresponds with a slot or opening 10 of the motor bearing, to permit a felt feeder to make a contact on the armature shaft.

In constructing the motor bearing, the safety device is placed in position in the outer shell or casing. A mandrel is then placed in the latter, and the soft metal is poured to make the lining in which the safety device is embedded. The soft metal flows around the safety device, which has beveled side edges 11, to enable it to interlock with the soft metal lining, which securely retains the safety device in position. After the lining is molded, the motor bearing is removed from the mandrel and is placed in a lathe, and is turned to fit the motor shaft. The safety device presents a concave upper face to the motor shaft, and is adapted to form a support for the same should the soft metal lining melt, and the said device will prevent the armature from dropping upon the poles in event of the melting of the soft metal lining. The upper concave face of the plate 3 is flush with the inner bearing surface of the lining, and it constitutes a portion of the bearing surface.

Having thus fully described my invention, what I claim as new and desire to secure by Letters Patent, is:—

1. The combination of a cylindrical casing provided with bottom openings, a safety brass resting on the inside of the casing at the bottom thereof and provided with studs fitted in the bottom openings of the cylindrical casing, said safety brass being also provided with a longitudinal opening, and a soft metal lining for the casing arranged flush with the journal brass and engaging the same to retain the lugs thereof in the bottom openings of the cylindrical casing, a portion of the soft metal lining being also arranged in and filling the longitudinal opening of the safety brass.

2. The combination of a cylindrical casing provided at its bottom with openings arranged near the ends of the casing, the latter being also provided at an intermediate point with a slot, a soft metal lining for the said casing, and a safety brass resting on the inside of the casing at the bottom thereof and provided with studs of unequal length fitting in the said openings, said safety brass having a recess at one edge, which registers with the slot of the casing.

In testimony, that I claim the foregoing as my own, I have hereto affixed my signature in the presence of two witnesses.

CHRISTOPHER T. POWELL.

Witnesses:
　CHARLES B. DARNELL,
　LAWRENCE B. HUCKEBY.